United States Patent
Hayama et al.

(10) Patent No.: US 8,800,710 B2
(45) Date of Patent: Aug. 12, 2014

(54) MOTORCYCLE

(71) Applicant: Honda Motor Co., Ltd., Tokyo (JP)

(72) Inventors: Yoshitaka Hayama, Wako (JP); Takuya Otsuka, Wako (JP); Yusuke Inoue, Wako (JP); Satoshi Matsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/785,008

(22) Filed: Mar. 5, 2013

(65) Prior Publication Data

US 2013/0233635 A1 Sep. 12, 2013

(30) Foreign Application Priority Data

Mar. 9, 2012 (JP) ................................. 2012-052855

(51) Int. Cl.
*B60K 13/04* (2006.01)

(52) U.S. Cl.
USPC ........... 180/296; 180/224; 180/219; 180/309; 180/89.2; 180/68.3; 181/228; 181/251; 181/227

(58) Field of Classification Search
USPC ............... 180/224, 296, 219, 309, 89.2, 68.3; 181/228, 251, 227
See application file for complete search history.

(56) References Cited

U.S. PATENT DOCUMENTS

| 1,772,589 | A | * | 8/1930 | Beamer | 181/265 |
| 3,187,834 | A | * | 6/1965 | Cassilly et al. | 181/283 |
| 6,675,933 | B2 | * | 1/2004 | Yamaguchi | 181/227 |
| 8,151,932 | B2 | * | 4/2012 | Inoue | 181/227 |
| 8,292,017 | B2 | * | 10/2012 | Inoue et al. | 180/219 |
| 2003/0079938 | A1 | * | 5/2003 | Yamaguchi | 181/227 |
| 2005/0236205 | A1 | | 10/2005 | Konno | |

FOREIGN PATENT DOCUMENTS

JP 2005-313671 A 11/2005

* cited by examiner

*Primary Examiner* — Joseph M Rocca
*Assistant Examiner* — Marlon Arce
(74) *Attorney, Agent, or Firm* — Birch, Stewart, Kolasch & Birch, LLP

(57) ABSTRACT

A motorcycle with a muffler disposed downwardly of a rider's seat positioned, in a side view, upwardly of a rear wheel when a rear shock absorber is extended, to minimize sideway bulging of the muffler from a vehicle body and improve ride comfort, while avoiding interference between the muffler and other parts. An outer shell of a muffler has a rhombus cross section. The muffler is disposed on at least one side in a vehicle width direction of a rear wheel wherein one pair of side walls extend in parallel with each other out of side walls of the outer shell extending in a vertical direction. A side cover is formed to extend along the upper and outer side walls of the four side walls of the outer shell to cover the muffler from a side, downwardly of a rider's seat.

14 Claims, 7 Drawing Sheets

MOTORCYCLE

CROSS-REFERENCE TO RELATED APPLICATIONS

The present application claims priority under 35 USC 119 to Japanese Patent Application No. 2012-052855 filed Mar. 9, 2012 the entire contents of that are hereby incorporated by reference.

BACKGROUND OF THE INVENTION

1. Field of the Invention

The present invention relates to a motorcycle having a vehicle body frame, an engine main unit mounted on the vehicle body frame, a swing arm having a rear end portion journaling a rear wheel and a front end portion vertically and swingably supported on the vehicle body frame, a rear shock absorber disposed between the vehicle body frame and the swing arm, and a muffler disposed downwardly of a rider's seat so as to be positioned, in a side view, upwardly of the rear wheel when the rear shock absorber is extended.

2. Description of Background Art

A motorcycle is known that includes a pair of mufflers, each of the mufflers being disposed on either left or right side of a rear wheel. See, for example, Japanese Patent Laid-Open No. 2005-313671.

The motorcycle disclosed in Japanese Patent Laid-Open No. 2005-313671 includes the pair of mufflers, each of the mufflers being disposed on either left or right side of the rear wheel so as to minimize sideway bulging from the vehicle body. However, the muffler has an outer shell with an obround cross-sectional shape that is vertically long. To avoid interference between a drive chain or a sprocket disposed sideways the rear wheel and the muffler disposed upwardly of the rear wheel when the rear shock absorber is compressed, the mufflers are disposed further upwardly or the crosswise width of the entire vehicle body is enlarged. There is nonetheless room for improvements in terms of ride comfort of an occupant sitting on the rider's seat.

SUMMARY AND OBJECTS OF THE INVENTION

The present invention has been made in view of the foregoing situation and it is an object of an embodiment of the present invention to provide a motorcycle that can minimize sideway bulging of a muffler from a vehicle body and improve ride comfort, while avoiding interference between the muffler and other parts.

To achieve the foregoing object, according to an embodiment of the present invention, a motorcycle includes a vehicle body frame; an engine main unit disposed on the vehicle body frame; a rear wheel; a swing arm having a rear end portion journaling the rear wheel and a front end portion vertically and swingably supported on the vehicle body frame; a rear shock absorber disposed between the vehicle body frame and the swing arm; a rider's seat; a muffler disposed downwardly of the rider's seat so as to be positioned, in a side view, upwardly of the rear wheel when the rear shock absorber is extended; and a side cover. The muffler includes an outer shell that has a rhombus cross section having two pairs of side walls, each pair including side walls extending in parallel with each other, the two pairs having long and short diagonal lines. The muffler is disposed on at least one side in a vehicle width direction of the rear wheel in such a position that, by inclining the long diagonal line of the two diagonal lines outwardly in the vehicle width direction at lower levels, one pair of the side walls out of the two pairs of side walls extends in a vertical direction. The side cover formed to extend along the upper and outer side walls out of the four side walls of the outer shell of the muffler is disposed so as to cover the muffler from a side, downwardly of the rider's seat.

According to an embodiment of the present invention, a pair of mufflers is each disposed on either side in the vehicle width direction of the rear wheel.

According to an embodiment of the present invention, a pair of side covers each includes an upper portion side cover disposed on the vehicle body frame so as to extend downwardly from either side of the rider's seat, while covering from an outer side an air cleaner disposed rearwardly of the engine main unit with a lower portion side cover disposed on an outer side of the muffler and separably connected in a connected row arrangement to the upper portion side cover.

According to an embodiment of the present invention, the motorcycle further includes at least one of a driven sprocket for transmitting drive to the rear wheel and a rear brake disc that forms part of a rear wheel disc brake for braking the rear wheel disposed on a side of the rear wheel, wherein out of the four side walls of the outer shell of the muffler, the side wall that faces downwardly is inclined upwardly toward a center in the vehicle width direction.

According to an embodiment of the present invention, the muffler has a rear end portion disposed forwardly in a side view of an axle of the rear wheel at least when the rear shock absorber is extended.

According to an embodiment of the present invention, the motorcycle further includes an exhaust pipe connected to a cylinder head of the engine main unit having a single cylinder and a branch pipe formed by connecting together upper and lower two plates so as to include a common connecting pipe section connected to a downstream end portion of the exhaust pipe with a pair of branch connecting pipe sections branching from the common connecting pipe section to respective sides and connected to the pair of left and right mufflers, respectively. A baffle plate is disposed at a portion at wherein the branch connecting pipe sections are connected in a connected row arrangement to the common connecting pipe section so as to be sandwiched between the two plates.

According to an embodiment of the present invention, the motorcycle further includes a rear brake caliper disposed across an upper portion at a front side of the rear brake disc, wherein the rear brake caliper is supported by an upper portion of the swing arm.

According to an embodiment of the present invention, the muffler including the outer shell having a rhombus cross section is disposed on at least one side in the vehicle width direction of the rear wheel in such a position that one pair of the side walls, extending in parallel with each other, of the outer shell extends in the vertical direction; and the side cover formed to extend along the upper and outer side walls out of the four side walls of the outer shell of the muffler is disposed so as to cover the muffler from a side. The arrangements minimize sideway bulging of the muffler from the vehicle body, while eliminating the need for disposing the muffler further upwardly or enlarging the crosswise width of the entire vehicle body with the aim of avoiding interference of the muffler with parts disposed at sides of the rear wheel. Thereby, sideway bulging of the side cover can be prevented and ride comfort can be improved.

According to an embodiment of the present invention, the pair of mufflers is each disposed on either side in the vehicle width direction of the rear wheel. Thus, the mufflers as a whole can achieve a sufficient volume to improve sound deadening performance.

According to an embodiment of the present invention, the pair of side covers each includes the upper portion side cover disposed on the vehicle body frame; and the lower portion side cover disposed on the outer side of the muffler and separably connected in a connected row arrangement to the upper portion side cover. For servicing the mufflers. Therefore, the lower portion side cover can be separated and removed from the upper portion side cover, that facilitates the service job.

According to an embodiment of the present invention, at least one of the driven sprocket and the rear brake disc is disposed on the side of the rear wheel. Of the four side walls of the outer shell of the muffler, the side wall facing downwardly is inclined upwardly toward the center in the vehicle width direction. This allows interference between at least one of the driven sprocket and the rear brake disc and the muffler to be easily avoided to thereby achieve a large stroke for the rear shock absorber. Thus, ride comfort can be improved even further.

According to an embodiment of the present invention, the rear end portion of the muffler is disposed in a side view forwardly of the axle of the rear wheel at least when the rear shock absorber is extended. This ensures that the muffler does not protrude rearwardly of the swing arm during egress. Thus, low-speed agility of the vehicle body is improved.

According to an embodiment of the present invention, the exhaust pipe connected to the cylinder head of the single-cylinder engine main unit is connected to the pair of mufflers, each of the mufflers being disposed on either side in the vehicle width direction of the rear wheel, via the branch pipe formed by connecting together the upper and lower two plates. Further, the baffle plate disposed at a branching section of the branch pipe is sandwiched between the two plates. This allows a baffling structure at the branching section to be formed at a lower cost.

According to an embodiment of the present invention, the rear brake caliper is supported by the upper portion of the swing arm. While the rear brake caliper can therefore be protected from below by the swing arm, a large stroke is achieved for the rear shock absorber by avoiding interference between the rear brake caliper and the muffler, thereby improving ride comfort.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

A specific embodiment to that the present invention is applied will be described below with reference to FIGS. 1 to 8. Throughout the descriptions given hereunder, longitudinal and crosswise directions are relative to a rider who rides a motorcycle.

Figure 1:
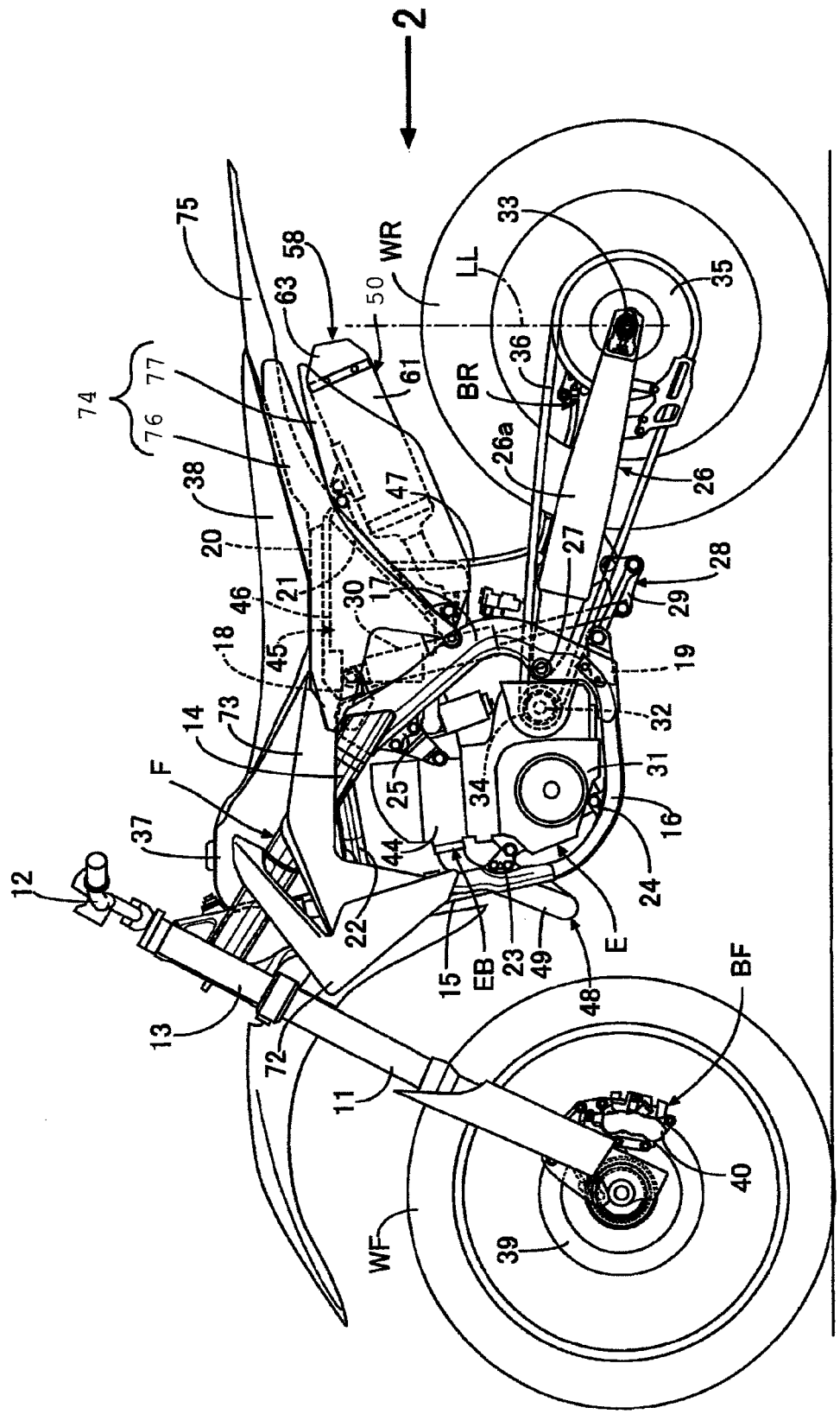
FIG. 1 is a left side elevational view showing a motorcycle according to an embodiment of the present invention.

A motorcycle shown in FIG. 1 is for motocross. The motorcycle includes a vehicle body frame F. The vehicle body frame F includes a head pipe 13, a pair of left and right main frames 14, a down frame 15, a pair of left and right lower frames 16, a pair of left and right pivot plates 17, an upper portion cross member 18, a lower portion cross member 19, a pair of left and right seat rails 20, a pair of left and right rear frames 21, and a reinforcing frame 22. More specifically, the head pipe 13 steerably supports a front fork 11, that journals a front wheel WF, and a bar-shaped steering handlebar 12. The main frames 14 extend downwardly toward the rear from the head pipe 13. The down frame 15 extends downwardly at a steeper angle than the main frames 14 toward the rear from the head pipe 13. The lower frames 16 are connected in a connected row arrangement to a lower end portion of the down frame 15 and extend rearwardly. The pivot plates 17 have upper end portions joined to rear end portions of the main frames 14 and extend downwardly. The pivot plates 17 have lower end portions connected in a connected row arrangement to rear end portions of the lower frames 16. The upper portion cross member 18 is disposed across the upper end portions of the pivot plates 17. The lower portion cross member 19 is disposed across the lower end portions of the pivot plates 17. The seat rails 20 have front end portions connected to the upper portion cross member 18 and extend rearwardly. The rear frames 21 connect vertical intermediate portions of the pivot plates 17 and rear portions of the seat rails 20. The reinforcing frame 22 has substantially a U-shape and connects a lower portion of the down frame 15 and the main frames 14.

An engine main unit EB of a single-cylinder engine E is disposed in a space surrounded by the main frames 14, the down frame 15, the lower frames 16, and the pivot plates 17. The engine main unit EB has a front portion supported on the down frame 15 via a first engine hanger 23, a lower portion supported by second engine hangers 24 disposed on the lower frames 16, and an upper portion supported on upper portions of the pivot plates 17 via third engine hangers 25.

A swing arm 26 that includes a pair of left and right arm portions 26a and 26b extending in a longitudinal direction on both sides across a rear wheel WR has a front end portion vertically swingably supported at lower portions of the pivot plates 17 via a pivot 27. An axle 33 of the rear wheel WR is journaled at rear end portions of the arm portions 26a and 26b.

A linkage mechanism 28 is disposed between the lower portion cross member 19 of the vehicle body frame F and the swing arm 26. A rear shock absorber 30 is disposed between a linkage member 29 that forms part of the linkage mechanism 28 and the upper portion cross member 18. More specifically, the rear shock absorber 30 has an upper end portion connected to the upper portion cross member 18 of the vehicle body frame F and a lower end portion connected to the swing arm 26 via the linkage member 29 of the linkage mechanism 28.

A transmission not shown is housed in a crankcase 31 that forms part of the engine main unit EB. The transmission includes an output shaft 32 that protrudes leftwardly from the crankcase 31. An endless chain 36 is wound around a drive sprocket 34 disposed on the output shaft 32 and a driven sprocket 35 disposed on the axle 33 of the rear wheel WR.

A fuel tank 37 is disposed on the main frames 14 upwardly of the engine main unit EB. A rider's seat 38 is disposed rearwardly of the fuel tank 37 so as to be supported on the seat rails 20.

A front wheel disc brake BF that includes a front brake disc 39 and a front brake caliper 40 is capable of braking the front wheel WF. More specifically, the front brake disc 39 is disposed on the left side of the front wheel WF so as to rotate with the front wheel WF. The front brake caliper 40 is supported on the front fork 11 so as to straddle an outer periphery of the front brake disc 39.

Figure 2:
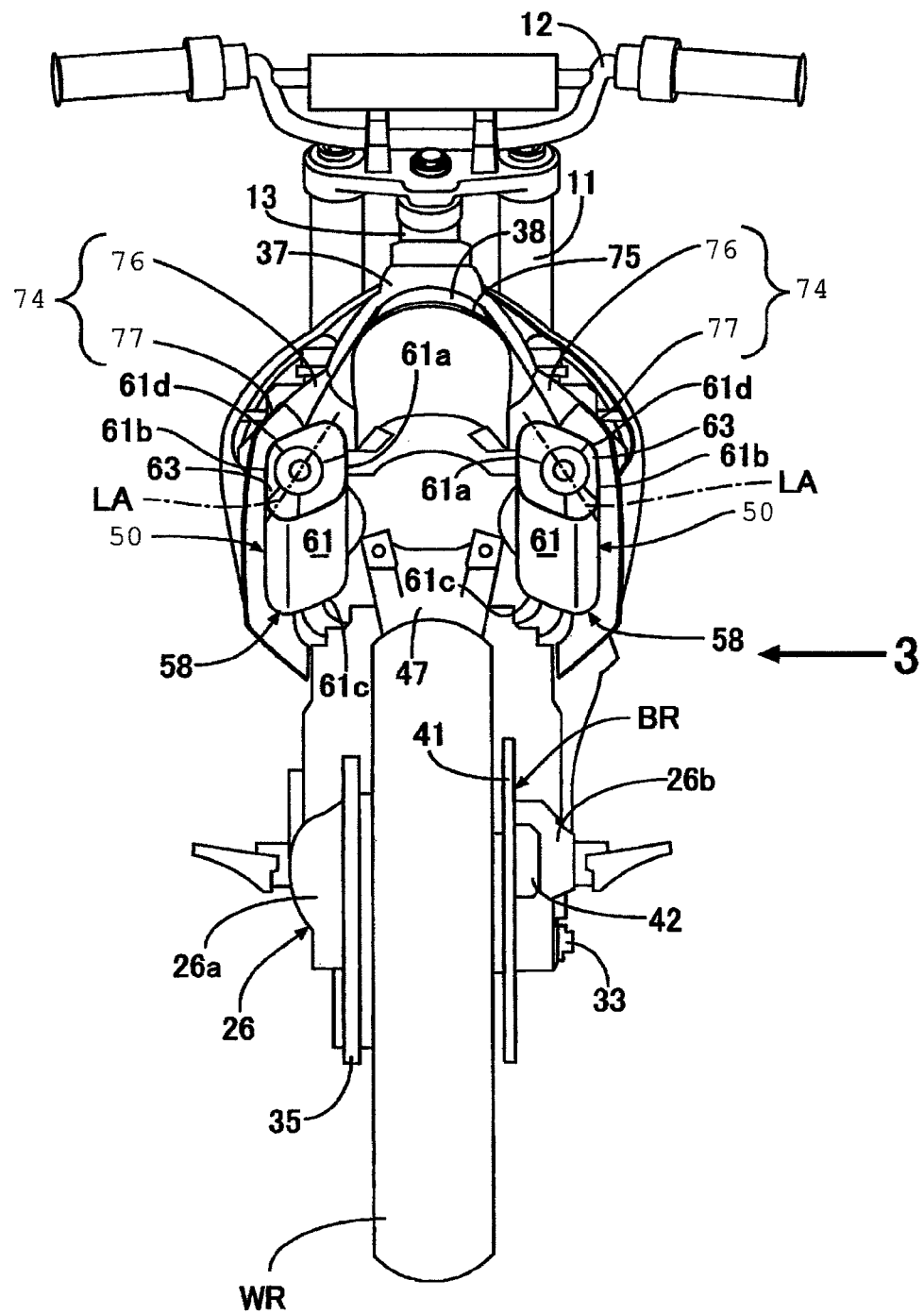
FIG. 2 is a view on arrow 2 of FIG. 1.
Figure 3:
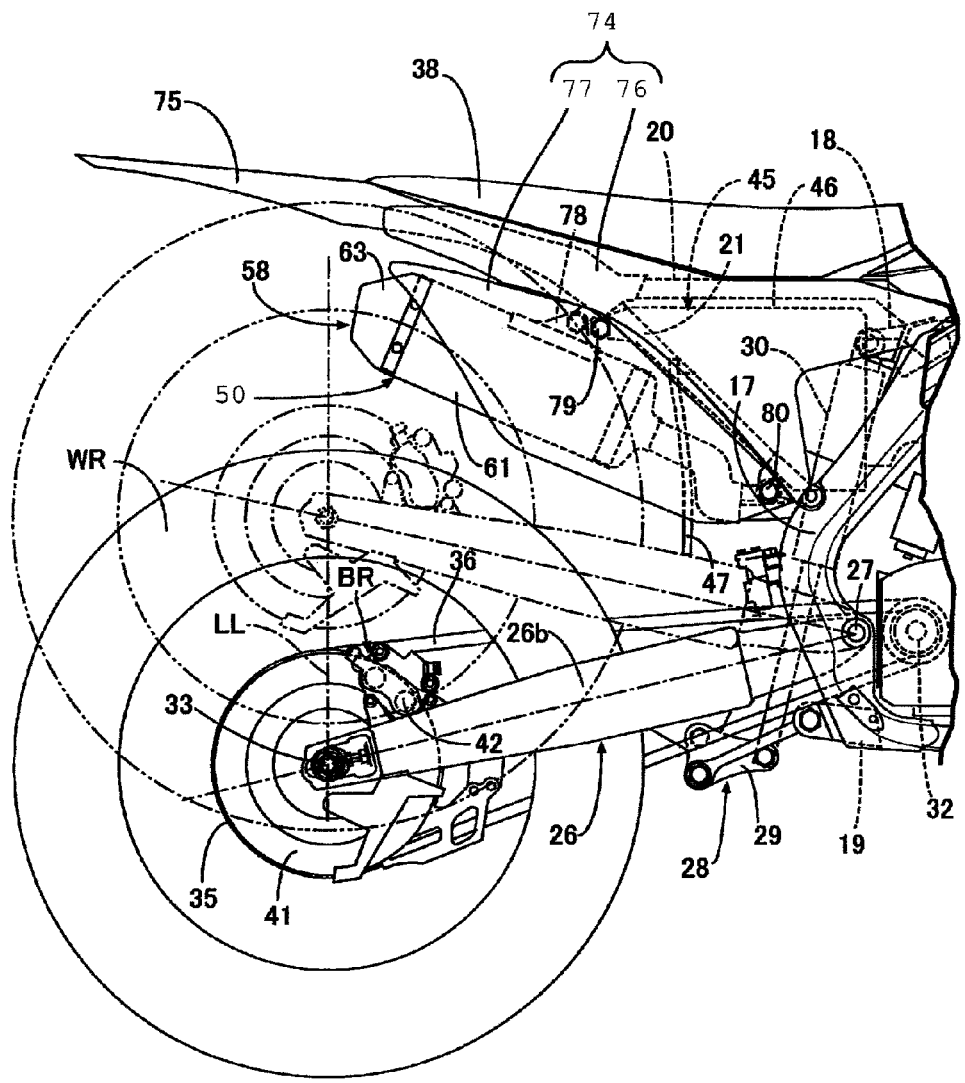
FIG. 3 is a view on arrow 3 of FIG. 2.

Referring also to FIGS. 2 and 3, a rear wheel disc brake BR that includes a rear brake disc 41 and a rear brake caliper 42 is capable of braking the rear wheel WR. More specifically, the rear brake disc 41 is disposed on the right side of the rear wheel WR so as to rotate with the rear wheel WR. The rear brake caliper 42 is supported on the right arm portion 26b of the swing arm 26 at a position across an outer periphery of the rear brake disc 41.

The rear brake caliper 42 is disposed across an upper portion on the front side of the rear brake disc 41 and supported by an upper portion on a rear end portion of the right arm portion 26b in the swing arm 26.

Referring to FIG. 1, an air cleaner 46 that forms part of an intake system 45 connected to a cylinder head 44 forming part of the engine main unit EB is supported by the seat rails 20 of the vehicle body frame F so as to be disposed rearwardly of the rear shock absorber 30 disposed rearwardly of the cylinder head 44 and downwardly of the rider's seat 38. A mud guard 47 that receives water or mud splashed forwardly from the rear wheel WR is mounted on a rear portion of the air cleaner 46 so as to be pendent from the air cleaner 46 at a position forward of the rear wheel WR.

Figure 4:
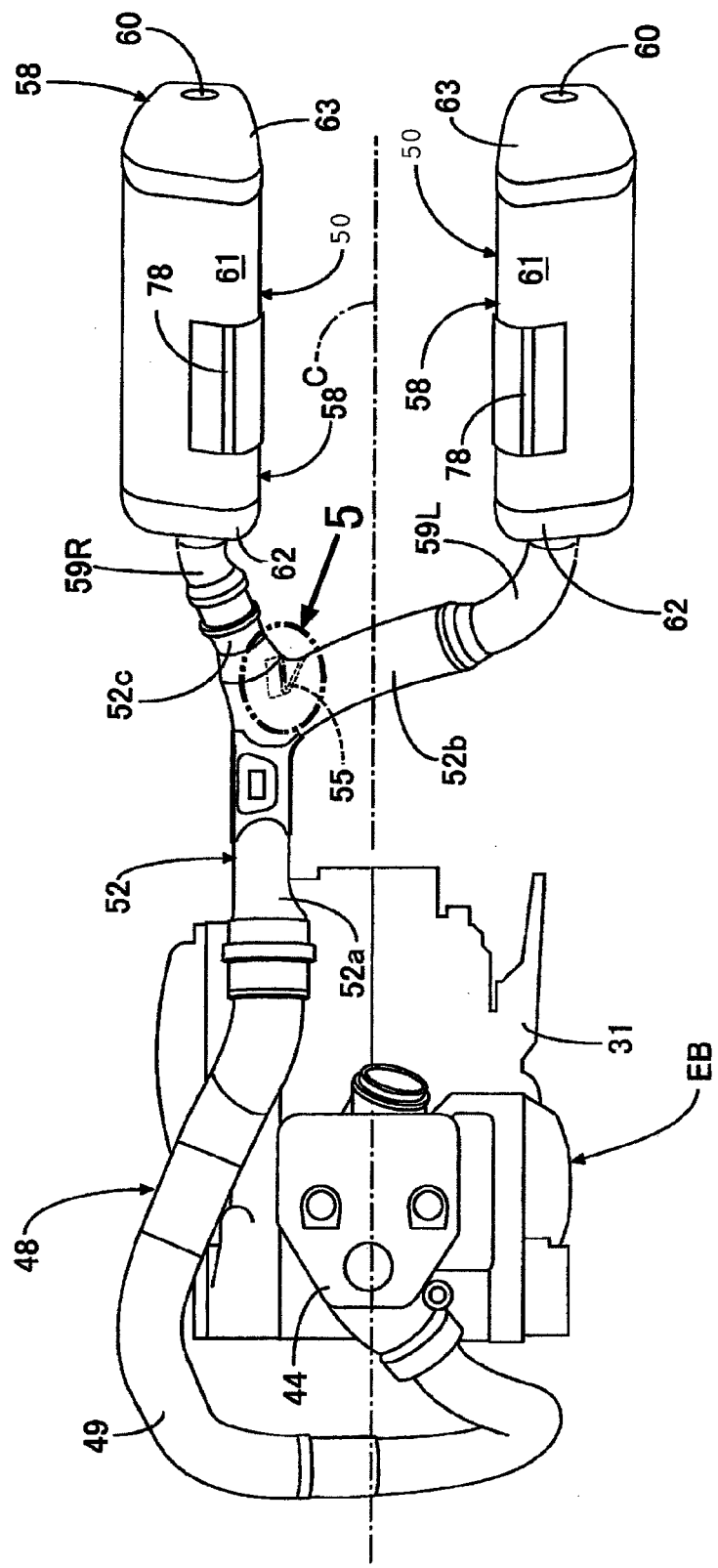
FIG. 4 is a plan view showing an engine main unit and an exhaust system.

Referring to FIG. 4, an exhaust system 48 connected to the cylinder head 44 in the engine main unit EB includes an exhaust pipe 49 and a muffler 50. More specifically, the exhaust pipe 49 is connected to a front wall surface of the cylinder head 44. The muffler 50 is disposed on at least one side in a vehicle width direction of the rear wheel WR. In accordance with the embodiment of the present invention, a pair of left and right mufflers 50 is disposed on respective sides in the vehicle width direction across the rear wheel WR downwardly of the rider's seat 38 so as to be positioned, in a side view, upwardly of the rear wheel WR when the rear shock absorber 30 is extended. Exhaust gas circulated from the exhaust pipe 49 is divided by a branch pipe 52 to be thereby circulated to the left and right mufflers 50.

The exhaust pipe 49 is formed so as to extend obliquely downwardly to the left front from the front wall surface of the cylinder head 44, reverse rightwardly at a position forward of the engine main unit EB and curve to extend obliquely rearwardly, and extend rearwardly at a position on the right of the cylinder head 44 and upward of the crankcase 31.

The branch pipe 52 is formed to include a common connecting pipe section 52a and a pair of branch connecting pipe sections 52b and 52c. More specifically, the common connecting pipe section 52a is connected to a downstream end portion of the exhaust pipe 49. The branch connecting pipe sections 52b and 52c branch from the common connecting pipe section 52a to respective sides and are connected to the pair of left and right mufflers 50, respectively.

The exhaust pipe 49 has a downstream side offset to the right side relative to a vehicle body centerline C in the vehicle width direction. The right muffler 50 is thus disposed on the right side of the vehicle body centerline C, while the left muffler 50 is disposed on the left side of the vehicle body centerline C. A length from the downstream end of the exhaust pipe 49 to the right muffler 50 by way of the branch pipe 52 is therefore shorter than a length from the downstream end of the exhaust pipe 49 to the left muffler 50 by way of the branch pipe 52. Given an identical flow path cross-sectional area, the foregoing results in a difference in circulation resistance, that causes an exhaust gas circulation amount to the right muffler 50 to tend to be more than an exhaust gas circulation amount to the left muffler 50. Out of the branch pipe 52, the branch connecting pipe section 52b connected to the left muffler 50 is therefore adapted to have a pipe diameter larger than that of the branch connecting pipe section 52c, out of the branch pipe 52, connected to the right muffler 50.

Figure 5:
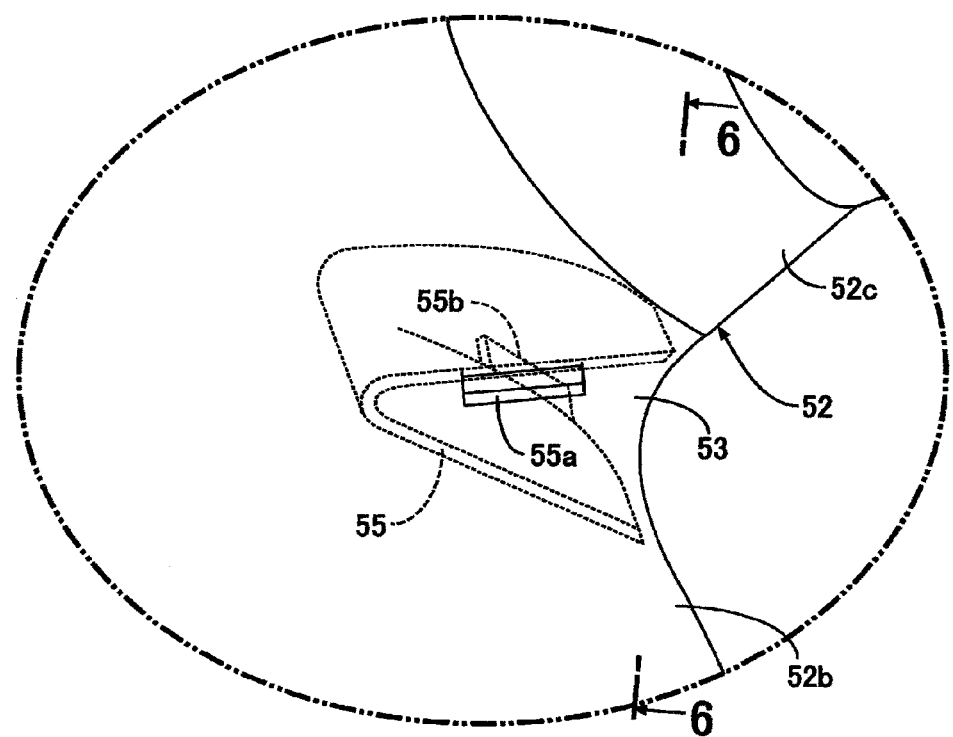
FIG. 5 is an enlarged view on arrow 5 of FIG. 4.
Figure 6:
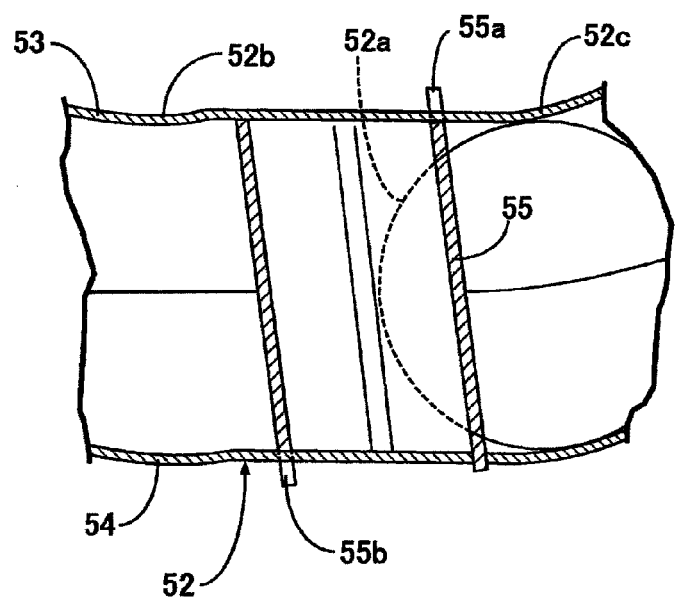
FIG. 6 is a cross-sectional view taken along line 6-6 of FIG. 5.

Referring to FIGS. 5 and 6, the branch pipe 52 is formed by connecting together upper and lower two plates 53 and 54, each having an arcuate cross section. A baffle plate 55 is disposed at a portion at that the branch connecting pipe sections 52b and 52c are connected in a connected row arrangement to the common connecting pipe section 52a in the branch pipe 52.

The baffle plate 55 is formed of a flat plate bent substantially into a V-shape so as to point to the side of the common connecting pipe section 52a. The baffle plate 55 is disposed in the branch pipe 52 so as to be sandwiched between the two plates 53 and 54. Further, the baffle plate 55 integrates a positioning protruding section 55a that penetrates the upper plate 53 and a positioning protruding section 55b that penetrates the lower plate 54. The baffle plate 55 is positioned inside the branch pipe 52 through the penetration of the positioning protruding sections 55a and 55b through, and engagement of the positioning protruding sections 55a and 55b with, the plates 53 and 54, respectively.

Figure 7:
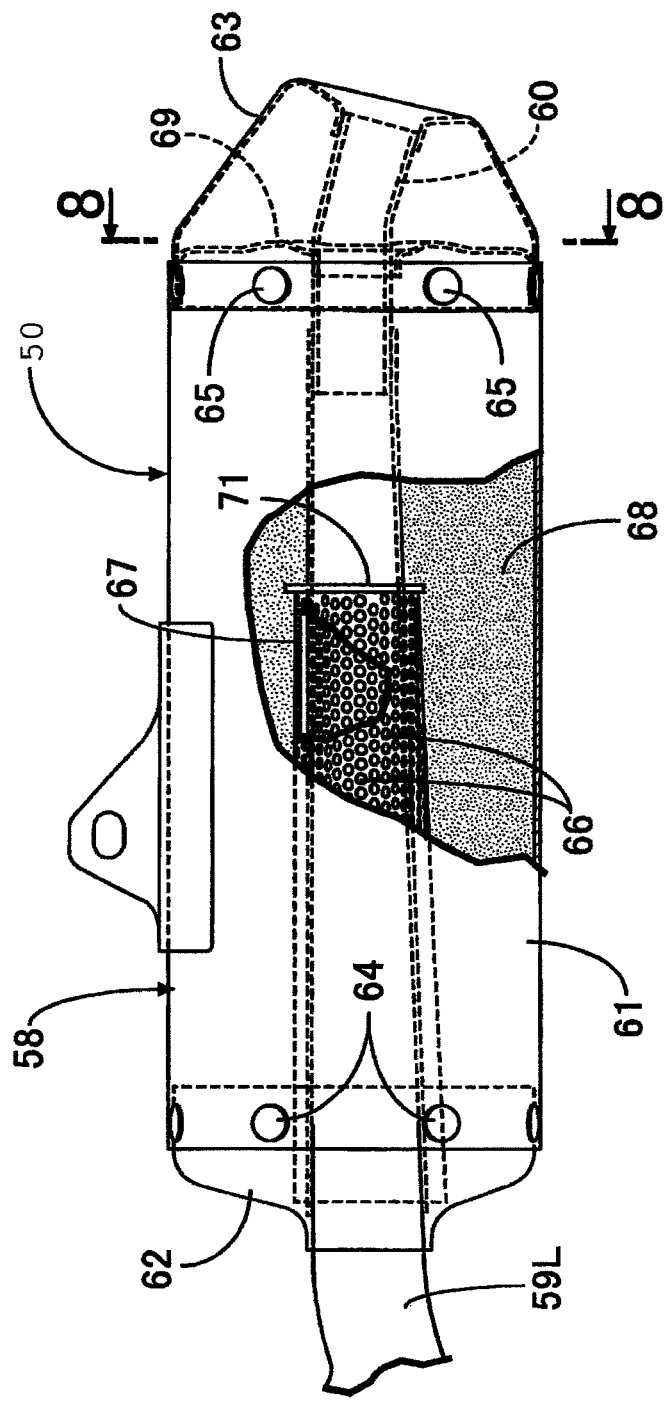
FIG. 7 is a partially cutaway side elevational view showing an exhaust muffler.

Referring to FIG. 7, the left muffler 50 includes an outer shell 58, an inner pipe 59L, and a tail pipe 60. The inner pipe 59L has an upstream end connected to the branch connecting pipe section 52b of the branch pipe 52 and airtightly penetrates a front end portion of the outer shell 58 to be inserted in the outer shell 58. The tail pipe 60 has an upstream end connected to a downstream end of the inner pipe 59L in the outer shell 58 and a downstream end opening in a rear end portion of the outer shell 58.

The outer shell 58 includes a tubular body 61, a front portion cap 62, and a rear portion cap 63. More specifically, the front portion cap 62 is connected to a front end portion of the tubular body 61 with a plurality of rivets 64, 64 . . . . The rear portion cap 63 is connected to a rear end portion of the tubular body 61 with a plurality of rivets 65, 65.

Figure 8:
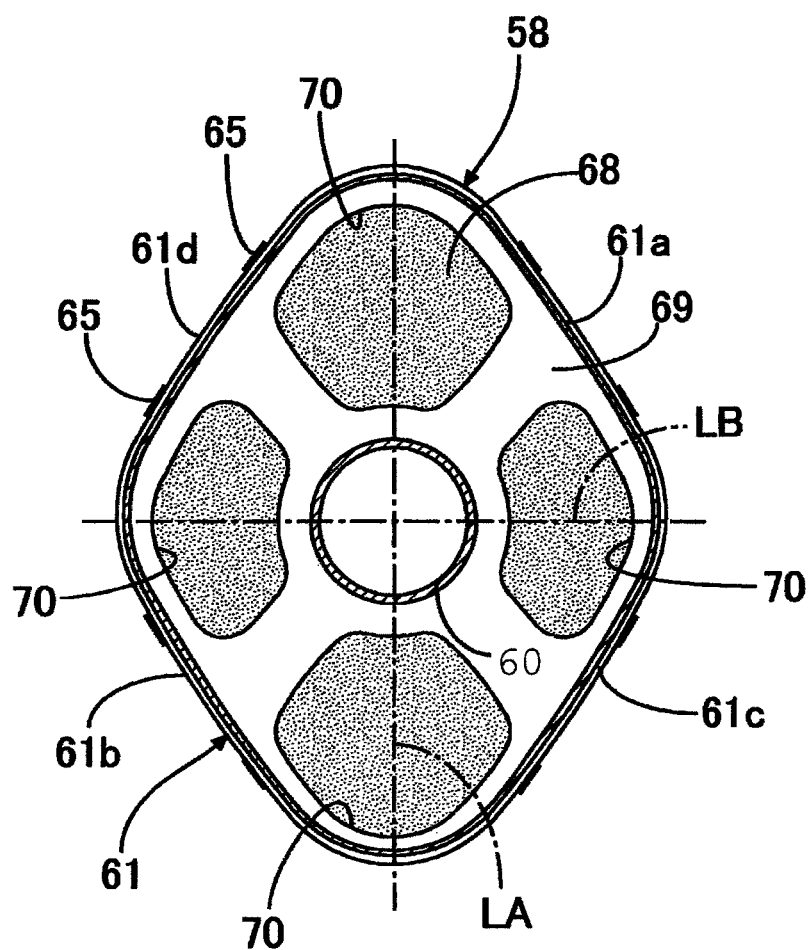
FIG. 8 is a cross-sectional view taken along line 8-8 of FIG. 7.

Referring to FIG. 8, the tubular body 61 of the outer shell 58 has a rhombus cross section having two pairs of side walls 61a and 61b; 61c and 61d, each pair including side walls extending in parallel with each other, the two pairs having long and short diagonal lines LA and LB. Thus, the front portion cap 62 and the rear portion cap 63 are each formed into the same rhombus as the cross section of the tubular body 61.

The inner pipe 59L in the outer shell 58 has a large number of through holes 66, 66. A flange-shaped stopper 71 that bulges radially outwardly from the inner pipe 59L is disposed on an outer surface of an intermediate portion of the inner pipe 59L at a position rearward of a portion having the through holes 66, 66. In addition, the inner pipe 59L is surrounded by a tubular net member 67 at the portion having the through holes 66, 66 so as to be axially positioned by the stopper 71.

Glass wool 68 is filled in the tubular body 61 and the front portion cap 62 of the outer shell 58. The stopper 71 protrudes outwardly from an outer periphery of the net member 67. The stopper 71 has an outer end biting into an inner periphery of the glass wool 68 at the intermediate portion in the longitudinal direction of the inner pipe 59L. This restricts movement of the glass wool 68 inside the tubular body 61 and the front portion cap 62.

A separator 69 having a plurality of openings 70, 70 is disposed at the rear end portion of the tubular body 61. The separator 69 has an outer peripheral portion connected, together with the rear portion cap 63, to the rear end portion of the tubular body 61 using the rivets 65, 65. The separator 69 defines the position of a rear end of the glass wool 68 in the outer shell 58. In addition, the tail pipe 60 penetrates a central portion of the separator 69.

The right muffler 50 includes an outer shell 58, an inner pipe 59R, and a tail pipe 60. The inner pipe 59R has an upstream end connected to the branch connecting pipe section 52c of the branch pipe 52 and airtightly penetrates a front end portion of the outer shell 58 to be inserted in the outer shell 58. The tail pipe 60 has an upstream end connected to a downstream end of the inner pipe 59R in the outer shell 58 and a downstream end opening in a rear end portion of the outer shell 58. The left muffler 50 and the right muffler 50 are formed symmetrically with each other in portions excluding the inner pipes 59L and 59R. The inner pipe 59L of the left muffler 50 is formed to have a large diameter to be consistent with the branch connecting pipe section 52b of the branch pipe 52. The inner pipe 59R of the right muffler 50 is formed to have a small diameter to be consistent with the branch connecting pipe section 52c of the branch pipe 52.

Referring to FIG. 2, the left and right mufflers 50 are disposed such that the long diagonal lines LA of the two diagonal lines LA and LB in the rhombus cross sections of the outer shells 58 of the mufflers 50 are inclined outwardly in the vehicle width direction at lower levels. The mufflers 50 are thus each disposed on either side in the vehicle width direction of the rear wheel WR such that, of the two pairs of side walls 61a and 61b; 61c and 61d of each of the outer shells 58, each pair including side walls extending in parallel with each other, the pair of side walls 61a and 61b extends in a vertical direction. More specifically, in the embodiment of the present invention, the side walls 61a and 61b are angled five degrees outside relative to a vertical line. Support plates 78 fixedly attached to the tubular bodies 61 of the outer shells 58 are supported by rear end portions of the rear frames 21 in the vehicle body frame F. In addition, of the four side walls 61a to 61d of the outer shells 58, the side walls 61c, 61c facing downwardly are inclined upwardly toward the center in the vehicle width direction.

Rear end portions of the mufflers 50, more specifically, rear end portions of the rear portion caps 63, are disposed forwardly in a side view of the axle 33 of the rear wheel WR at least when the rear shock absorber 30 is extended. As shown by a solid line in FIGS. 1 and 3, when the rear shock absorber 30 is extended, the rear end portions of the mufflers 50 are disposed forwardly of a vertical line LL that passes through an axis of the axle 33.

Referring to FIG. 1, a pair of left and right cowls 72 and a pair of left and right front portion side covers 73 that cover both sides of a lower portion of the fuel tank 37 are attached to a front portion of the vehicle body frame F. A pair of left and right side covers 74 is disposed at an intermediate portion in the longitudinal direction of the vehicle body frame F. The side covers 74 cover the air cleaner 46 and the mufflers 50 from sides. The side covers 74 have rear portions covering a front portion of a rear fender 75. The rear fender 75 has a front end portion supported by the air cleaner 46. The rear fender 75 extends rearwardly from the rider's seat 38 so as to cover the rear wheel WR from above.

The side covers 74 are formed to extend along the upper and outer side walls 61d and 61b of the four side walls 61a to 61d of the outer shells 58 of the mufflers 50, to thereby cover the mufflers 50 from the outside, downwardly of the rider's seat 38.

More specifically, the side covers 74 include upper portion side covers 76 and lower portion side covers 77. The upper portion side covers 76 are mounted on the vehicle body frame F so as to extend downwardly from both sides of the rider's seat 38, while covering from outer sides the air cleaner 46 disposed rearwardly of the engine main unit EB. The lower portion side covers 77 are disposed on outer sides of the mufflers 50 and are separably connected in a connected row arrangement to the upper portion side covers 76. In the embodiment of the present invention, the lower portion side covers 77 are removably fastened to the rear frames 21 of the vehicle body frame F with bolts 79 and 80.

Effects of the embodiment of the present invention will be described below. The outer shells 58 of the mufflers 50 each have a rhombus cross section having the two pairs of side walls 61a and 61b; 61c and 61d, each pair including the side walls extending in parallel with each other, the two pairs having the long and short diagonal lines LA and LB. The muffler 50 is disposed on at least one side in the vehicle width direction of the rear wheel WR in such a position that, by inclining the long diagonal line LA of the two diagonal lines LA and LB outwardly in the vehicle width direction at lower levels, one pair of side walls 61a and 61b out of the two pairs of side walls 61a and 61b; 61c and 61d extends in the vertical direction. The side covers 74 that are formed to extend along the upper and outer side walls 61d and 61b of the four side walls 61a to 61d of the outer shells 58 of the mufflers 50 are disposed so as to cover the mufflers 50 from sides, downwardly of the rider's seat 38. This minimizes sideway bulging of the mufflers 50 from the vehicle body, while eliminating the need for disposing the mufflers 50 further upwardly or enlarging the crosswise width of the entire vehicle body with the aim of avoiding interference of the mufflers 50 with parts disposed at sides of the rear wheel WR. Thereby, sideway bulging of the side covers 74 can be prevented and ride comfort can be improved.

The mufflers 50 are each disposed on either side in the vehicle width direction of the rear wheel WR. The mufflers 50 as a whole can achieve a sufficient volume to improve sound deadening performance.

The side covers 74 include the upper portion side covers 76 and the lower portion side covers 77, the upper portion side covers 76 being mounted on the vehicle body frame F so as to extend downwardly from both sides of the rider's seat 38 while covering from outer sides the air cleaner 46, and the lower portion side covers 77 being disposed on outer sides of the mufflers 50 and are separably connected in a connected row arrangement to the upper portion side covers 76. For servicing the mufflers 50, therefore, the lower portion side covers 77 can be separated and removed from the upper portion side covers 76, thereby facilitating servicing.

At least one (both in the embodiment of the present invention) of the driven sprocket 35 for transmitting drive to the rear wheel WR and the rear brake disc 41 that forms part of the rear wheel disc brake BR for braking the rear wheel WR is disposed on the side of the rear wheel WR. Of the four side walls 61a to 61d of the outer shells 58 of the mufflers 50, the side walls 61c facing downwardly are inclined upwardly toward the center in the vehicle width direction. This allows interference between at least one (both in the embodiment of the present invention) of the driven sprocket 35 and the rear brake disc 41, and the mufflers 50 to be easily avoided to thereby achieve a large stroke for the rear shock absorber 30. Thus, ride comfort can be further improved.

The rear end portions of the mufflers 50 are disposed in a side view forwardly of the axle 33 of the rear wheel WR at least when the rear shock absorber 30 is extended. This ensures that the mufflers 50 do not protrude rearwardly of the swing arm 26 during egress. Thus, low-speed agility of the vehicle body is improved.

The exhaust pipe 49 is connected to the cylinder head 44 of the single-cylinder engine main unit EB. The baffle plate 55, disposed at the portion wherein the branch connecting pipe sections 52b and 52c are connected in a connected row arrangement to the common connecting pipe section 52a, is disposed in the branch pipe 52 so as to be sandwiched between the upper and lower two plates 53 and 54. The branch pipe 52 is formed by connecting together the two plates 53 and 54 to include the common connecting pipe section 52a connected to the downstream end portion of the exhaust pipe 49 and the pair of branch connecting pipe sections 52b and 52c that branch from the common connecting pipe section 52a to respective sides and are connected to the pair of left and right mufflers 50. These arrangements allow a baffling structure at the branch section to be formed at a low cost. Further, in the embodiment of the present invention, the baffle plate 55 is formed of a flat plate bent substantially into a V-shape, that allows the baffling structure to be formed at even lower cost.

In addition, the rear brake caliper 42 that is disposed across the upper portion on the front side of the rear brake disc 41 is supported by the upper portion of the swing arm 26. Therefore, while the rear brake caliper 42 can be protected from below by the swing arm 26, a large stroke is achieved for the rear shock absorber 30 by avoiding interference between the rear brake caliper 42 and the muffler 50, thereby improving ride comfort.

While the exemplary preferred embodiment of the present invention has been described with particularity, it is to be understood that the above-described embodiment is not intended to limit the present invention and various changes in form and detail may be made therein without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a vehicle body frame;
an engine main unit disposed on the vehicle body frame;
a rear wheel;
a swing aim having a rear end portion journaling the rear wheel and a front end portion vertically and swingably supported on the vehicle body frame;
a rear shock absorber disposed between the vehicle body frame and the swing arm;
a rider's seat;
a muffler disposed downwardly of the rider's seat and positioned, in a side view, upwardly of the rear wheel when the rear shock absorber is extended; and
a side cover;
wherein the muffler includes an outer shell having a rhombus cross section with two pairs of side walls, each pair including side walls extending in parallel with each other, the two pairs having long and short diagonal lines;
the muffler is disposed on at least one side in a vehicle width direction of the rear wheel wherein by inclining the long diagonal line of the two diagonal lines outwardly in the vehicle width direction at lower levels, one pair of the side walls out of the two pairs of side walls extends in a vertical direction; and
the side cover formed to extend along the upper and outer side walls out of the four side walls of the outer shell of the muffler is disposed to cover the muffler from a side, downwardly of the rider's seat;
wherein the muffler has a rear end portion disposed forwardly in a side view of an axle of the rear wheel at least when the rear shock absorber is extended.

2. The motorcycle according to claim 1, wherein a pair of mufflers is each disposed on either side in the vehicle width direction of the rear wheel.

3. The motorcycle according to claim 2, wherein a pair of side covers each includes:
an upper portion side cover disposed on the vehicle body frame so as to extend downwardly from either side of the rider's seat, while covering from an outer side an air cleaner disposed rearwardly of the engine main unit; and
a lower portion side cover disposed on an outer side of the muffler and separably connected in a connected row arrangement to the upper portion side cover.

4. The motorcycle according to claim 1, and further comprising:
at least one of a driven sprocket for transmitting drive to the rear wheel and a rear brake disc that forms part of a rear wheel disc brake for braking the rear wheel disposed on a side of the rear wheel;
wherein, out of the four side walls of the outer shell of the muffler, the side wall that faces downwardly is inclined upwardly toward a center in the vehicle width direction.

5. The motorcycle according to claim 2, and further comprising:
at least one of a driven sprocket for transmitting drive to the rear wheel and a rear brake disc that forms part of a rear wheel disc brake for braking the rear wheel disposed on a side of the rear wheel;
wherein, out of the four side walls of the outer shell of the muffler, the side wall that faces downwardly is inclined upwardly toward a center in the vehicle width direction.

6. The motorcycle according to claim 3, and further comprising:
at least one of a driven sprocket for transmitting drive to the rear wheel and a rear brake disc that forms part of a rear wheel disc brake for braking the rear wheel disposed on a side of the rear wheel;
wherein, out of the four side walls of the outer shell of the muffler, the side wall that faces downwardly is inclined upwardly toward a center in the vehicle width direction.

7. The motorcycle according to claim 2, further comprising:
an exhaust pipe connected to a cylinder head of the engine main unit having a single cylinder; and
a branch pipe formed by connecting together upper and lower two plates so as to include:

a common connecting pipe section connected to a downstream end portion of the exhaust pipe;

a pair of branch connecting pipe sections branching from the common connecting pipe section to respective sides and connected to the pair of left and right mufflers, respectively; and a baffle plate disposed at a portion wherein the branch connecting pipe sections are connected in a connected row arrangement to the common connecting pipe section so as to be sandwiched between the two plates.

8. The motorcycle according to claim 4, further comprising:

a rear brake caliper disposed across an upper portion at a front side of the rear brake disc;

wherein the rear brake caliper is supported by an upper portion of the swing arm.

9. A motorcycle comprising:

a vehicle body frame;

a rear wheel;

a swing arm having a rear end portion journaling the rear wheel and a front end portion vertically and swingably supported on the vehicle body frame;

a rear shock absorber disposed between the vehicle body frame and the swing arm;

a muffler disposed, in a side view, upwardly of the rear wheel when the rear shock absorber is extended; and a side cover;

wherein the muffler includes an outer shell having a rhombus cross section with two pairs of side walls, each pair including side walls extending in parallel with each other, the two pairs having long and short diagonal lines;

the muffler is disposed on at least one side in a vehicle width direction of the rear wheel wherein by inclining the long diagonal line of the two diagonal lines outwardly in the vehicle width direction at lower levels, one pair of the side walls out of the two pairs of side walls extends in a vertical direction; and the side cover formed to extend along the upper and outer side walls out of the four side walls of the outer shell of the muffler is disposed to cover the muffler from a side;

wherein the muffler has a rear end portion disposed forwardly in a side view of an axle of the rear wheel at least when the rear shock absorber is extended.

10. The motorcycle according to claim 9, wherein a pair of mufflers is each disposed on either side in the vehicle width direction of the rear wheel.

11. The motorcycle according to claim 10, wherein a pair of side covers each includes:

an upper portion side cover disposed on the vehicle body frame so as to extend downwardly from either side of the rider's seat, while covering from an outer side an air cleaner disposed rearwardly of the engine main unit; and a lower portion side cover disposed on an outer side of the muffler and separably connected in a connected row arrangement to the upper portion side cover.

12. The motorcycle according to claim 9, and further comprising:

at least one of a driven sprocket for transmitting drive to the rear wheel and a rear brake disc that forms part of a rear wheel disc brake for braking the rear wheel disposed on a side of the rear wheel;

wherein, out of the four side walls of the outer shell of the muffler, the side wall that faces downwardly is inclined upwardly toward a center in the vehicle width direction.

13. The motorcycle according to claim 10, further comprising:

an exhaust pipe connected to a cylinder head of the engine main unit having a single cylinder; and a branch pipe formed by connecting together upper and lower two plates so as to include:

a common connecting pipe section connected to a downstream end portion of the exhaust pipe;

a pair of branch connecting pipe sections branching from the common connecting pipe section to respective sides and connected to the pair of left and right mufflers, respectively; and a baffle plate disposed at a portion wherein the branch connecting pipe sections are connected in a connected row arrangement to the common connecting pipe section so as to be sandwiched between the two plates.

14. The motorcycle according to claim 12, further comprising:

a rear brake caliper disposed across an upper portion at a front side of the rear brake disc;

wherein the rear brake caliper is supported by an upper portion of the swing arm.

* * * * *